United States Patent [19]
Pozzuoli

[11] Patent Number: 5,982,595
[45] Date of Patent: Nov. 9, 1999

[54] REDUNDANT COMMUNICATIONS IN A PROTECTIVE RELAY

[75] Inventor: Marzio Pozzuoli, Maple, Canada

[73] Assignee: General Electric Company, Schenectady, N.Y.

[21] Appl. No.: 09/092,030

[22] Filed: Jun. 5, 1998

[51] Int. Cl.[6] .................................................... H02H 3/00
[52] U.S. Cl. .......................... 361/62; 361/64; 361/66; 361/115
[58] Field of Search ................................ 361/62, 64, 66, 361/115, 68, 69, 59

[56] References Cited

U.S. PATENT DOCUMENTS

| | | | |
|---|---|---|---|
| 3,725,818 | 4/1973 | Nurmohamed et al. | 330/124 |
| 4,528,611 | 7/1985 | Udren | 361/81 |
| 4,899,383 | 2/1990 | Einolf, Jr. et al. | 380/48 |
| 4,972,290 | 11/1990 | Sun et al. | 361/64 |

*Primary Examiner*—Stephen W. Jackson
*Attorney, Agent, or Firm*—Thomas M. Blasey; Carl B. Horton

[57] ABSTRACT

A redundant communications scheme for a protective relay which allows high-speed, reliable, and fault tolerant communications between peer protective devices in a power distribution network. Communications over a selectable primary communication channel are interrupted and switched to a secondary communication channel, which can operate according to a different communication protocol, when a fault is detected on the primary communication channel. The fault detection and switching is performed transparently to the main protective relay processor.

25 Claims, 2 Drawing Sheets

REDUNDANT COMMUNICATIONS IN A PROTECTIVE RELAY

FIELD OF THE INVENTION

The present invention relates generally to intelligent, networked protective relays. More particularly, the present invention provides a redundant communications scheme for network communication of protective relay data.

BACKGROUND OF THE INVENTION

To further enhance protective control of electrical power distribution systems, intelligent protective relay devices have been developed which are provided with communication capabilities to communicate protective relay data. To date, network communication capabilities have been implemented using data rates of less than 1 Megabits per second, and using RS-485, RS-232, fiber optic asynchronous serial interfaces, or UART interfaces. Typically, communication among networked protective relays has been implemented using "master-slave" protocols, in which certain network devices are prioritized. For example, U.S. Pat. No. 4,972,290 to Sun et al. discloses an electrical power distribution system with remote monitoring and control of protective relays. The disclosed system includes slave stations which continuously monitor activity of analog protective relays, and a master station which communicates with the slave monitoring stations and stores network relay data. The Sun patent also discloses communication of relay data via RS-232 communication channels.

While the desire for protective relays having communications capabilities has been recognized, there are shortcomings associated with known schemes for communicating protective relay information. For example, known relay communication schemes do not adequately address potential problems relating noise (e.g., due to electromagnetic interference) and communication line faults, and do not adequately provide high speed (greater than 1 Mbps) communication capability. Further, the environment in which intelligent protective relays operate is subject to severe conditions, including relatively wide temperature variations, which presents design challenges for potential solutions to the problem of providing a reliable, fault-tolerant, high-speed communications scheme for protective relays.

SUMMARY OF THE INVENTION

The present invention solves the above-mentioned problems, and achieves additional advantages, by providing for a redundant communications scheme for a networked control device in a power distribution system. According to exemplary embodiments of the invention, a digital protective relay is provided with a redundant communications circuit which can communicate relay information with peer devices over a network using a primary ethernet communication channel. The communications circuit is capable of detecting the presence of a fault or failure on the primary communication channel, and of switching the communication from the primary channel to a secondary channel. The circuit performs the detection and switching in a manner which is transparent to the main relay processing circuitry. Preferably, the primary communication channel type can be selected by a user without reprogramming the relay. Further, the communications circuit is industrially hardened to withstand operating conditions associated with electric utility substations, which can include a temperature range of approximately −40° C. to approximately +85° C. The communications circuit advantageously provides multiple fiber communications ports on a single card.

BRIEF DESCRIPTION OF THE DRAWINGS

The present invention can be understood more clearly upon reading the following Detailed Description of Preferred Embodiments in conjunction with the accompanying drawings, in which.

DETAILED DESCRIPTION

Figure 1:
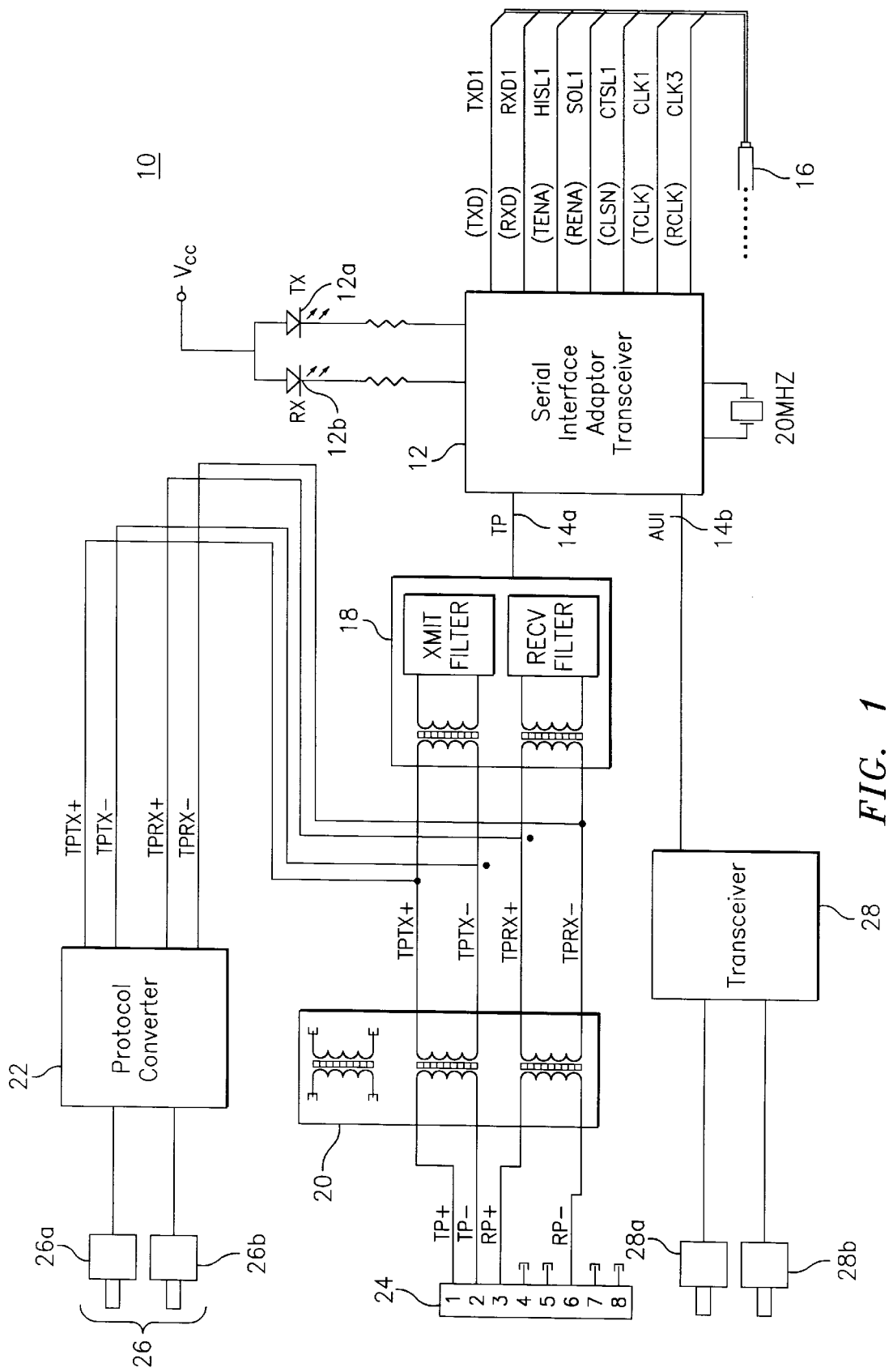
FIG. 1 is a block diagram of a communication circuit for a protective relay according to an embodiment of the present invention.

Referring now to FIG. 1, a communication circuit 10 for a digital protective relay is shown. The circuit includes a serial interface adaptor/transceiver 12 which receives a plurality of control signals on lines TXD, RXD, TENA, RENA, CLSN, TCLK, and RCLK via an interface connector 16, which is electrically connected to an associated digital protective relay. The serial interface adaptor/transceiver 12 includes first and second ports 14a and 14b for transmitting and receiving protective relay data. According to one embodiment of the present invention, the communication circuit 10 is implemented as a daughter card, and the interface connector 16 interfaces the serial interface adaptor/transceiver 12 with a mother board of the digital protective relay. The serial interface adaptor/transceiver 12 can be implemented by a Motorola MC68160 Enhanced Ethernet Interface circuit, or other suitable component.

The data ports 14a and 14b provide primary and secondary communication capabilities. The data ports can transmit and receive data according to the same or different communication protocols. According to an exemplary embodiment, the first data port 14a provides primary communications capabilities over a user-selected ethernet communication channel, as will be described in more detail below. According to an exemplary embodiment of the present invention, the second data port 14b conforms to IEEE standard 802.3 for an Access Unit Interface (AUI) port, and first data port 14a conforms to IEEE standard 802.3 for a 10BaseT Twisted Pair (TP) interface port.

The first data port 14a interfaces, to pulse transformers and filters 18, which provides isolation and noise filtration for data to be transmitted to, or received from, a primary communication channel which is connected to a network including some number of protective relay devices. The primary communication channel can include a plurality of user-selectable communication channels. In the example shown in FIG. 1, the twisted pair interface TPTX+, TPTX−, TPRX+, and TPRX− connect the pulse transformers/filters 18 to a bank of isolation transformers 20, and to a protocol converter 22. The isolation transformers 20 are connected to a first primary communication channel interface 24, which can be a 10BaseT ethernet interface, and the protocol converter 22 is connected to a second primary communication channel interface 26. The first primary communication channel interface 24 can include a RJ45 connector, or other suitable connector, for connection to the network, and the second primary communication channel interface can include a fiber optic transmitter and receiver 26a and 26b. The protocol converter 22 converts communication signals between a first and a second communication protocol (e.g., between 10BaseT and 10BaseFL ethernet protocols). It should be appreciated that the use of multiple primary channel interfaces allows a user to determine the type of primary channel interface. It should also be appreciated that the configuration shown in FIG. 1 allows an installer to control the type of primary channel interface without reprogramming of the protective relay device. The protocol converter 22 can be implemented by a ML4669 integrated circuit, or by other suitable components.

The second data port 14b is connected to a secondary transceiver 28, which exchanges communication signals with the network over secondary fiber optic transmitter and receiver 28a and 28b. The secondary transceiver 28 can be implemented by a HFBR-4663 integrated circuit, or by other suitable components.

The serial interface adaptor/transceiver 12 is operatively connected to transmit and receive LEDs 12a and 12b, respectively. The LEDs are connected to a supply voltage and provide an indication of whether the serial interface adaptor/transceiver 12 is engaged in a transmission or reception operation.

Figure 2:
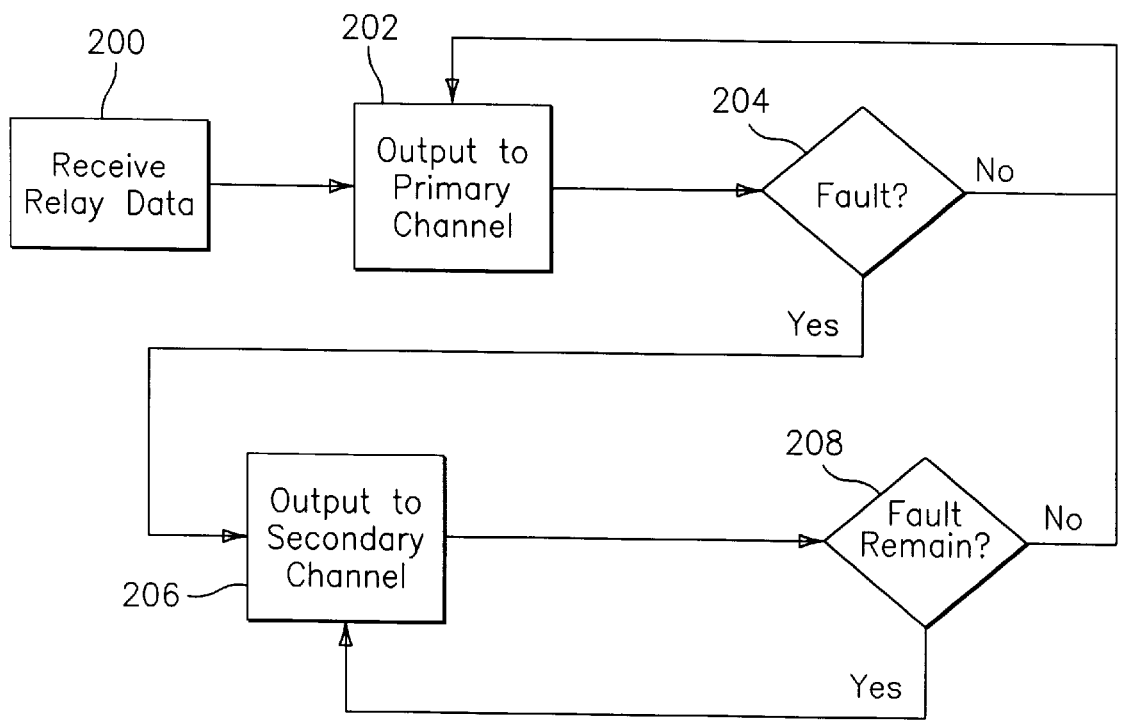
FIG. 2 is a flow chart describing an exemplary transmission scheme in accordance with the present invention.

In operation, the serial interface adaptor transceiver 12 transmits protective relay data over the network according to the exemplary method shown in the flow chart of FIG. 2. In step 200, the serial interface adaptor transceiver 12 receives protective relay information, and control signals, via interface connector 16 and lines TXD, TENA, TCLK, etc. In step 202, the serial interface adaptor transceiver 12 outputs the relay information to be transmitted through the primary communication channel, via first data port 14a, according to a first communication format (e.g., 10BaseT). The relay information output through first data port 14a can be filtered, as shown in FIG. 1, and is then provided to the primary communication channel which has been preselected during installation of the protective relay. In the example of FIG. 1, if the primary communication channel is selected as 10BaseT, the execution of step 202 will involve sending the relay information over lines TPTX+ and TPTX−, through isolation transformers 20, to first primary communication channel interface 24. If the primary communication channel is selected as 10BaseFL, the execution of step 202 will involve sending the relay information to protocol converter 22, which converts the 10BaseT data to 10BaseFL data, and supplies the converted data to second primary communication channel interface 26.

In step 204, the serial interface adaptor/transceiver 12 determines whether there is a communication fault on the primary communication channel. Such a determination can be made, for example, based on the presence or absence of Valid link beats or frames at the first data port 14a. If there is no communication fault on the primary communication channel, the process returns to step 202 to continue transmitting relay information on the primary communication channel. If the adaptor/transceiver 12 determines that a communication fault (e.g., impairment which exceeds a threshold value) exists in step 204, then in step 206 the adaptor/transceiver 12 switches the transmission process to the secondary communication channel. According to an aspect of the present invention, the adaptor/transceiver 12 implements the switch from the primary to the secondary communication channel automatically without intervention by the main processing circuitry of the protective relay. In other words, the switch is transparent to the main protective relay control algorithm. Because the communication channel failure detection and switch is transparent to the main protective relay processing module, the main relay processing module is able to devote its resources to the execution of protection and control algorithms without the additional burden of monitoring and switching between communication channels. Further, by separating the fault detection and switching operations from the main protection processing operations, the detection and switching can be performed quickly to enhance the reliability of the network communications. According to a preferred embodiment of the present invention, the steps of detecting primary channel failure (step 204) and switching to a secondary channel (step 206) is performed in less than approximately 1.5 ms.

Once the adaptor/transceiver 12 switches to the secondary communication channel, the relay information to be transmitted is provided, in an appropriate data format, to secondary transceiver 28, which transmits the relay information over the network according to, in this example, 10BaseFL.

As shown in FIG. 2, the transmission over the second channel can continue until the fault on the primary channel is removed (e.g., when the adapter/transceiver 12 determines that the fault no longer remains). If it is determined that the fault remains in step 208, the process returns to step 206. It if is determined in step 208 that the fault no longer remains, the process returns to step 202 (i.e., the output is switched back to the primary channel). It will be appreciated that alternatively, transmission can continue indefinitely on the secondary channel, or at least until a fault occurs on the secondary channel, at which time the transmission can be switched back to the primary channel.

It will be appreciated that for ease of explanation, only the transmission of relay information has been described, and that the reception of relay information from the network proceeds similarly to the transmission, and can be performed substantially simultaneously with the transmission.

It should be appreciated that the communications circuit described above can communicate to peer devices directly via the network, and that communication of signals to an intermediate master communication device is unnecessary.

The communications circuit of the present invention is preferably implemented in a single daughter card which interfaces with a motherboard associated with a protective relay. The daughter card, along with the entire protective relay, is preferably industrially hardened such that it can withstand temperatures from approximately −40° C. to approximately +85° C.

In addition to using industrial-grade (−40° C. to +85° C.) rather than conventional commercial grade (0° to 70° C.), the industrially-hardened device of the preferred embodiment is subjected to a variety of electrical tests relating to, for example, electrical transients (e.g., ANSI/IEEE C37.90.1), oscillatory transients (ANSI/IEEE C37.90.1), insulation resistance (IEC 255-5), dielectric strength (IEC 255-6), electrostatic discharge (EN 61000-4-2, level 4), surge immunity (EN 61000-4-5, level 5), magnetic field immunity (EN 61000-4-8), voltage dips (EN61000-4-11), and/or RFI susceptibility (ANSI/IEEE C37.90.2, EN 61000-4-3). These tests ensure that the device is capable of conditions commonly experienced in electrical power distribution systems. Conventional ethernet cards, for example, do not pass such tests.

It should be appreciated from the foregoing description that the present invention provides high-speed (e.g., 10 Mbps), reliable, and fault-tolerant network communications between peer protective devices in a power distribution network. Further, the present invention provides redundant fiber communications capability in a networked protective play.

While the foregoing description includes many details and specificities, it will be understood that these are for illustrative purposes only and are not to be construed as limitations of the invention. Numerous modifications will be readily apparent which do not depart from the spirit and scope of the invention, as defined by the following claims and their legal equivalents.

What is claimed is:

1. A protective relay with redundant communications capabilities, comprising:

a digital relay processing module which performs protection and control functions in a power distribution network;

connections for electrically connecting to a line in a power distribution system; and a plurality of communications ports for communicating relay data over one of a plurality of channels, communicating over a primary communication channel if no faults are detected by the relay on the primary communication channel, and communicating over a secondary channel if the relay detects a fault on the primary communication channel.

2. The protective relay of claim 1, wherein the primary communication channel is user-determined.

3. The protective relay of claim 1, wherein the protective relay communicates relay information with peer devices.

4. The protective relay of claim 1, wherein at least one of the primary and secondary communication channels is an ethernet channel.

5. The protective relay of claim 4, wherein the communication card performs the detection of faults and switching transparently to the relay processing module.

6. The protective relay of claim 4, wherein the communication card is industrially hardened to withstand a temperature range of approximately −40° C. to approximately +85° C.

7. The protective relay of claim 4, wherein the primary communication channel is selectable between first and second ethernet protocols, and the secondary communication channels is one of the first and second ethernet protocols.

8. The protective relay of claim 4, wherein the communication ports include an IEEE 802.3 10BaseT twisted pair interface port Unit.

9. The protective relay of claim 4, further comprising a communication card for detecting primary communication channel faults and switching the relay to communicate over the secondary communication channel.

10. The protective relay of claim 9, wherein the detection and switching is performed in less than approximately 1.5 ms.

11. A circuit for providing redundant communications in a digital protective relay comprising:

a serial interface adaptor transceiver for controlling the exchange of protective relay information between the digital protective relay and a network, including selecting one of a plurality of communication channels for communicating protective relay information;

a first transceiver for exchanging protective relay information between the serial interface adaptor transceiver and the network over a first communication channel, when the first communication channel is selected; and a second transceiver for exchanging protective relay information between the serial interface adaptor transceiver and the network over a second communication channel when the second communication channel is selected.

12. The circuit of claim 11, wherein at least one of the plurality of communication channels includes a 10BaseT Ethernet channel.

13. The circuit of claim 11, wherein at least one of the plurality of communication channels includes a 10BaseFL Ethernet channel.

14. The circuit of claim 11, wherein the first transceiver is a 10BaseT to 10Base-FL converter.

15. The circuit of claim 11, wherein the second transceiver is a 10BaseFL transceiver.

16. The circuit of claim 11, wherein the serial interface adaptor transceiver includes a twisted pair interface for interfacing with the first transceiver, and a IEEE 802.3 Access Unit Interface port for interfacing with the second transceiver.

17. The circuit of claim 11, wherein the circuit communicates with peer devices in the network.

18. The circuit of claim 11, wherein the circuit is industrially hardened to withstand a temperature range of approximately −40° C. to approximately +85° C.

19. The circuit of claim 11, wherein the serial interface adaptor transceiver selects a communication channel based on the presence of a fault or interference on a primary one of the communication channels.

20. The circuit of claim 19, wherein the first communication channel is user-determined.

21. A method for transmitting protective relay information from a protective relay, comprising the steps of:

receiving protective relay information to be transmitted;

determining whether a primary communication channel is subject to a fault or interference condition;

transmitting the protective relay information on the primary communication channel if the primary communication channel is not subject to the fault or interference condition, and switching the transmission of the protective relay information to a secondary communication channel if the primary communication channel is subject to the fault or interference condition.

22. The method of claim 21, wherein at least one of the primary communication channel and the secondary communication channel is an ethernet channel.

23. The method of claim 21, wherein the step of determining is performed by a serial interface adaptor transceiver.

24. The method of claim 21, wherein the step of determining is transparent to the protective relay.

25. The method of claim 21, wherein the step of switching is performed in less than approximately 1.5 ms.

* * * * *